(No Model.)
G. C. MOORE.
SHUTTLE OPERATING MECHANISM FOR NARROW WARE LOOMS.
No. 488,213. Patented Dec. 20, 1892.
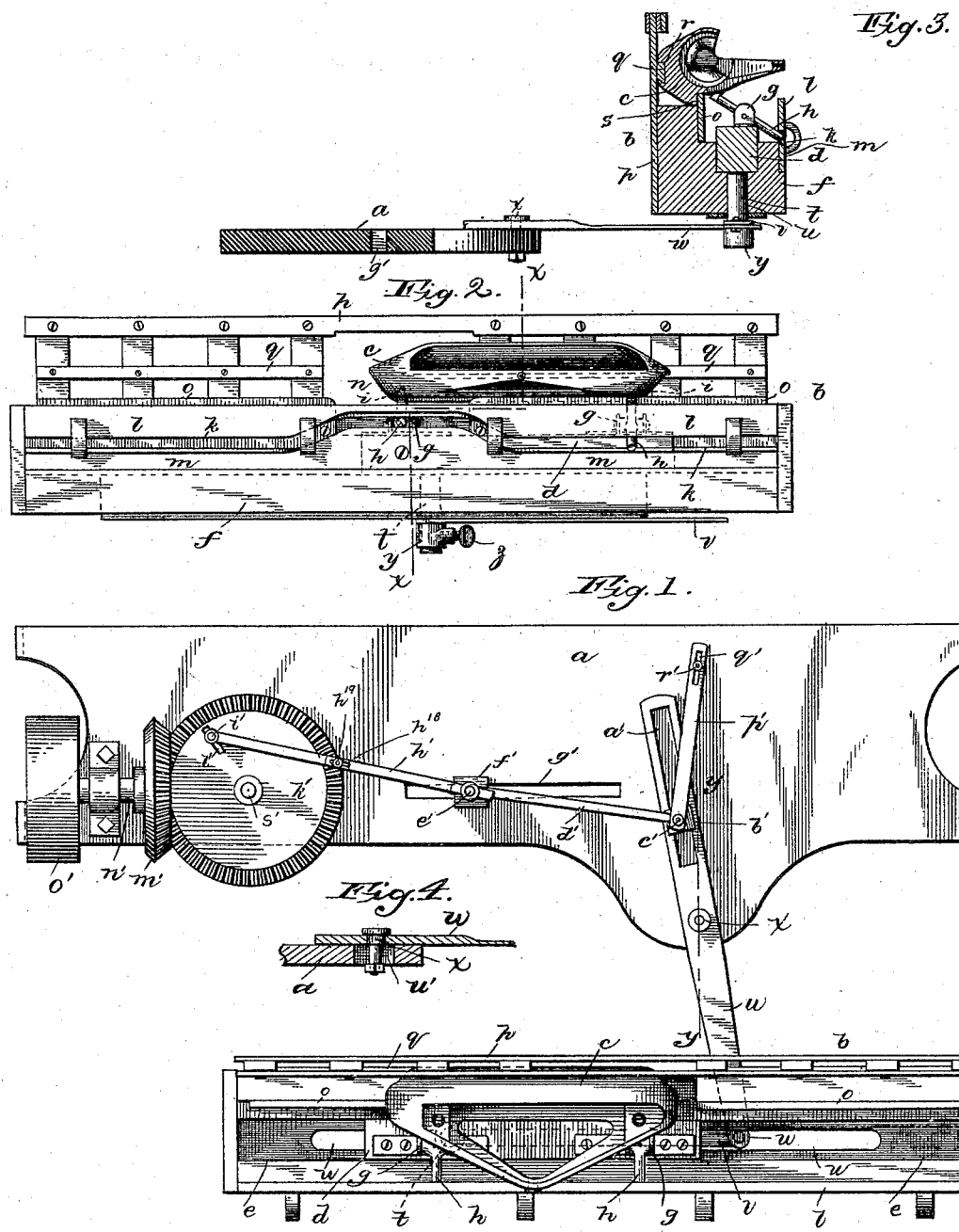

UNITED STATES PATENT OFFICE.

GEORGE C. MOORE, OF EASTHAMPTON, MASSACHUSETTS, ASSIGNOR OF ONE-HALF TO JOSEPH W. GREEN, JR., OF SAME PLACE.

SHUTTLE-OPERATING MECHANISM FOR NARROW-WARE LOOMS.

SPECIFICATION forming part of Letters Patent No. 488,213, dated December 20, 1892.

Application filed April 6, 1892. Serial No. 428,005. (No model.)

*To all whom it may concern:*

Be it known that I, GEORGE C. MOORE, a citizen of the United States, residing at Easthampton, in the county of Hampshire and State of Massachusetts, have invented certain new and useful Improvements in Shuttle-Operating Mechanism for Narrow-Ware Looms, of which the following is a specification, reference being had therein to the accompanying drawings.

The objects of my invention are to provide a shuttle-motion for narrow-ware looms which shall be simple in construction, which shall provide for the operation of the shuttle with a minimum of friction on its guides, and in which the shuttle shall be so supported and operated that it cannot wedge or bind in position and cause a smash as sometimes now occurs in looms. I attain these objects by an improved construction and arrangement of parts in which my invention resides, and my said invention will first be described with reference to the accompanying drawings and then be particularly pointed out in the claims at the close of this specification.

In the accompanying drawings, Figure 1 is a view in plan of sufficient of the parts of a loom to which my invention is represented as applied to show the character and connections of the said invention, this view illustrating a part of the lathe or batten of a narrow-ware loom, a shuttle mounted and supported on guides forming part of or carried by the said lathe or batten, and the devices for moving the said shuttle on the said guides. Fig. 2 is a view in front elevation of the part of the lathe or batten which is represented in Fig. 1 and of the shuttle and other parts connected with the lathe or batten. Fig. 3 is a view in cross section on the line *x—x* in Fig. 1. Fig. 4 is a view in section on line *y—y* in Fig. 1.

In the drawings *a* may be taken as representing a part of the frame-work of a narrow-ware loom, and *b* a part of the lathe or batten of said loom, while *c* designates a shuttle. Ordinarily, the shuttle of a narrow-ware loom is formed with or carries a small rack which engages with pinions that are pivoted to the lathe or batten, the said pinions being partially rotated, first in one direction and then in the other, to move the shuttle, by means of a reciprocating rack moving endwise on the lathe or batten in the direction of the length of the latter. The shuttle thus operated is held in position and guided ordinarily by means of two vertical boards or rails having their adjacent edges somewhat separated, the body of the shuttle fitting into the space between the said adjacent edges of the said boards or rails and being formed with grooves near the rear side thereof into which the said edges project, one of the grooves being on the upper surface of the shuttle body and the other on the lower surface thereof. With this construction and arrangement it frequently happens, particularly after the parts become worn, that when a broken thread becomes entangled in the shed it will deflect the shuttle in its course and cause it to wedge between the top and bottom shuttle boards or rails. Even the shaking of the floor sometimes will cause the same thing to happen. When the shuttle thus wedges it always stops the other shuttles and breaks or strains something, frequently making a bad and expensive smash. Another disadvantageous feature about the construction and arrangement thus described is that the grooves in the top and bottom of the shuttle body, in order that they may be out of the way of the shuttle-operating devices, are formed as near the back or rear side of the shuttle body as they safely can be put without destroying the strength of the shuttle body. When a shuttle has these grooves near its back or rear side and is placed in position between the shuttle boards or rails, obviously nearly all of the weight of the shuttle body and its attachments and load of yarn are in front of the shuttle boards or rails, this tending to produce great friction and binding action. When the shuttle is actuated by the racks and pinions described the top shuttle board or rail must be provided in order that the shuttle may be held pressed down on to its actuating pinions, otherwise the shuttle might rise or jump so as to carry the teeth of the rack thereon out of engagement with the teeth of the pinions.

In the construction illustrated in the drawings I dispense with the racks and pinions and provide for the actuation of the shuttle a reciprocating carrier *d* consisting mainly of a bar moving in a longitudinal groove or recess *e* in the body of the beam *f* of the lathe or batten. To supports *g g* on the top of this block or bar *d* levers *h h* are pivoted, there being a pair of these levers for each shuttle to be operated, and the levers of the pair being at a distance apart approximating the length of the shuttle body, but a little less than such length. The rear ends of these levers are upturned as shown and adapted to enter notches or recesses *i* formed in the under part of the shuttle body. The forward ends of these levers *h* project through a slot *k* between the adjacent edges of two boards or rails *l m* which are attached to the front of the beam *f*. The portion of this slot which is in front of the reed or warp space *n* is at a higher level than the portions thereof at the opposite sides of the said space, the different levels being connected by upward inclines at opposite sides of the higher level, all being as shown and as will be clearly understood.

In some respects the devices which have just been mentioned resemble devices which heretofore have been known and used in a like connection. As will be apparent, when the carrier *d* is in such position that the end of a lever *h* is in the lower level the forward end of the said lever will be depressed and thereby the rear end thereof will be lifted sufficiently to engage with the end of the shuttle and thereby cause the shuttle to move with the carrier, while when one or the other of the said levers is moving past the warp space the forward end of the said lever will be raised by the higher level of the slot *k* and the rear end thereof will be disengaged from the shuttle body. As usual in similar constructions, the shuttle body is greater in length than the warp and reed space *n*, and than the higher level of the slot *k*, and it therefore occurs that as the carrier *d* is reciprocated, although the levers are successively disengaged from the shuttle body while passing space *n*, one or the other of said levers *h* is at all times in engagement with the shuttle body. In the movement of the carrier in either direction, when the forward lever reaches the higher level of the slot it is turned on its pivot to withdraw its rear end from engagement with the shuttle body, but the following or other lever remains engaged with the shuttle body until the forward or first lever has passed beyond the higher level of the slot *k*, whereupon the action is reversed, the forward or leading lever again engaging with the shuttle body while the following or second lever becomes disengaged therefrom, and so on as will be apparent. As it moves along the beam *f*, the shuttle is supported by resting on the plain upper edges of bars *o* which are secured to the beam *f* in a vertical position at some distance in front of the line of the reeds, these bars supporting the shuttle at a point about midway between the back and the front thereof. The shuttle is equally balanced on the bottom guide board, the back guide rail being merely a safety guide. Also, to the supports *p* applied to the rear of the beam *f* are secured the ribs or harrow rails *q*, which, as shown, are beveled or dove-tailed on the under sides thereof. In the rear of the shuttle is formed a groove *r* corresponding in shape to the ribs or rails *q*, which latter fit within the said groove and therefore serve to guide and support the shuttle as it moves, the bevel or dovetail serving to retain the shuttle ordinarily in proper position on its guides. The lower side of the shuttle body is rabbeted, forming a shoulder *s* which bears against the rear side of the shuttle boards *o*, thus aiding in guiding the shuttle. In consequence of employing the boards *o*, and having them placed well forward from the rear of the shuttle body the shuttle is more equally balanced and the friction occurring in its movements is reduced to a minimum. Also, as a result of the omission of the old boards placed above the shuttle for holding it down against its actuating pinions or the peg devices heretofore in use, and by employing the bevel or dovetailed guiding ribs or rail *q* in engagement with the rear side of the shuttle body, I am enabled to reduce the depth of the shuttle body to an extent equal to the depth of the groove which ordinarily is formed in the top of a shuttle for the top guide board, which depth is usually about three-eighths of an inch. At the same time I am enabled to form within the shuttle body a cop-holding chamber more nearly approaching the full dimensions of the shuttle body than heretofore, thus permitting me to place within the shuttle a cop very much larger than it has heretofore been found expedient to employ.

The combination with the devices which I employ for supporting and guiding the shuttle of the shuttle-moving devices shown obviates all danger of damage resulting from the shuttle being caused to wedge or bind in its guides, for should the shuttle refuse to move at any time the pressure of its actuating devices applied to it would throw it upward and out of its track altogether, this being permitted by the play between the shuttle and its guides so that it would neither impede nor obstruct the movement of the other shuttles employed in the loom or other parts of the loom.

For the purpose of actuating the carrier *d* it is provided on its under side with a pin *t* passing downward through a slot *u* in the beam *f*. This pin *t* has applied to it one end of a connecting rod *v* the other end of which is pivotally connected to the forward end of the lever *w*, the said lever being pivoted on a stud *x* mounted on the framing *a*. On the pin *t* beneath the lever *w* is a retaining collar *y* clamped in place on the pin by a screw *z*. The rear end of the lever *w* is formed with a longitudinal slot *a'* in which is free to play a block *b'* to which is pivoted at *c'* one end of a rod $d'$, the other end of which is pivoted at $e'$ to block $f'$ moving in a slot $g'$ in the framing $a$, or on a corresponding guide suitably supported. The rod $h'$ has one end thereof pivoted to the block $f'$ at $e'$, and the other end thereof connected by a stud or bolt $i'$ to a wheel $k'$. The stud or bolt $i'$ is eccentrically disposed on the wheel $k'$ so as to form a crank pin and is mounted in a radial slot $l'$ to permit of the throw of the crank being adjusted as desired. I have shown the wheel $k'$ as being formed as a bevel gear wheel, the teeth whereof are engaged by those of a bevel gear wheel $m'$ made fast on a driving shaft $n'$ provided with a band pulley $o'$. A radius bar $p'$ has one end thereof pivoted at $c'$ to the block $b'$, while the other end thereof, which is formed with a longitudinal slot $q'$ is pivotally connected to the framing $a$ by a stud or bolt $r'$ passing through the said slot $q'$. The guiding slot $g'$, or equivalent guide, between the lever $w$ and the crank-wheel $k'$, is arranged in line with the axis $s'$ of the said crank-wheel $k'$, this enabling me to secure uniformity in the forward and return stroke derived from the crank, as otherwise, owing to the influence of the radius bar $p'$, the movement communicated to the lever $w$ and the shuttle driver would vary undesirably in the different portions of each complete reciprocation thereof, the forward movement differing in speed and timing from the return movement. The radius bar enables me to regulate the speed with which the lever $w$ shall travel as it moves in either direction. By its use I am enabled to cause the said lever, when starting from either extreme position, to gradually increase its speed to the maximum at the middle point of the said sweep, and then gradually decrease its speed until it comes to rest at the opposite end of the sweep. Adjustment of the radius bar in the direction of its length will vary the amount of dwell at the ends of the sweep or stroke. Adjustment of the stud $x$ along the slot $u'$ in the framing $a$ would vary the stroke of the forward end of the said lever, making it greater or less according as the stud or bolt was moved forwardly or rearwardly. Said adjustment of stud $x$, however, if accompanied by proportionate adjustment of the radius bar $p'$ with reference to its pivotal stud $r'$, will cause the stroke to remain the same in extent but will enable the amount of dwell which occurs at each end of the stroke of the lever to be varied. The amount of said dwell will be increased as the said radius bar is adjusted rearwardly upon its pivotal stud $r'$, and decreased as the said radius bar is adjusted forwardly on the said stud. It will of course be seen that if desired the radius bar alone may be adjusted relatively to its pivotal stud and in consequence the stroke of the lever $w$ will be varied in extent for, as will be obvious, the point at which the rod $d'$ is connected with the said lever will by said adjustment be shifted relatively to the lever $w$.

The connecting rod $h'$ is made in two parts, one of them having a slot $h^{18}$ through which a bolt or screw $h^{19}$ passes into the other thereby enabling the length of the rod to be adjusted.

I claim as my invention:—

1. The combination of the shuttle having a groove $r$ in its rear side and a shoulder $s$ on its under side, of the lathe or batten provided with plain guiding boards $o$ on the upper edges of which the shuttle rests with the shoulder in contact with the rear sides of the said boards, the guide ribs or rails $q$ beveled or dovetailed as described and entering the groove $r$, the carrier $d$, the levers $h$ engaging with the shuttle, and the boards or rails $l\ m$, having the slot $k$ between them into which the forward ends of the levers $h$ enter, substantially as described.

2. The combination with the carrier-operating lever $w$, and the rotating wheel $k'$, of an intermediately placed block or box $f'$ having a guide therefor in line with the axis of the said wheel, connecting rods interposed between a crank pin carried by the said wheel and the said block or box and also between the latter and the lever, and a radius bar in connection with one end of the rod which extends from the block or box to the carrier-operating lever, substantially as described.

3. The combination with a rotating wheel carrying a crank-pin, of a carrier-operating lever and pivotal stud for the said lever having provisions for adjusting the same, a radius bar having provisions for enabling the same to be adjusted in the direction of its length, and operating connections intermediate the crank-pin and the carrier-operating lever, the said radius bar controlling the action of the said crank-pin upon the carrier-operating lever through its connections, substantially as described.

4. The combination with the rotating wheel $k'$ carrying a crank pin, of the carrier-operating lever $w$ having the slot $a'$ therein, the pivotal stud $x$ having provisions to enable it to be adjusted in position, the block $b'$ moving in said slot, the radius bar $p'$ controlling position of the said block in the slot and itself having provisions to enable it to be adjusted in the direction of its length, the intermediate block or box $f'$ having a guide in line with the axis of the revolving wheel $k'$, and rods whereby the said block $f'$ is connected with the crank pin and with the block $b'$, substantially as described.

In testimony whereof I affix my signature in presence of two witnesses.

GEO. C. MOORE.

Witnesses:
DAVID HILL,
S. JOSIE HILL.